United States Patent Office 3,705,112
Patented Dec. 5, 1972

3,705,112
NOVEL HOT-PRESSED REFRACTORY ARTICLES
AND PREPARATION THEREOF
Louis F. Nienart, Elizabeth, N.J., assignor to Allied
Chemical Corporation, New York, N.Y.
No Drawing. Continuation-in-part of application Ser. No.
657,769, Aug. 2, 1967. This application Jan. 6, 1970,
Ser. No. 1,060
Int. Cl. H01b 1/06; C04b 35/66, 35/48
U.S. Cl. 252—520                    6 Claims

ABSTRACT OF THE DISCLOSURE

Solid, electrically conductive articles composed of a mixture of the diboride and the nitride of titanium and/or zirconium are described. These articles are prepared by hot-pressing finely divided particles of the metal with boron nitride, the mixture optionally containing elemental boron and molybdenum disilicide, at a temperature of at least 2000° C. under pressure of from 2000 to 15,000 p.s.i. under an inert atmosphere. The articles of the invention are useful as cathode connector bars for the electrolytic cell used in preparing aluminum. In addition their refractory and mechanical strength properties make them suitable for many applications in and around industrial furnaces, rocket and jet engines, and the like.

---

This application is a continuation-in-part of my copending application Ser. No. 657,769, filed Aug. 2, 1967, now abandoned.

The electrolytic process for the manufacture of aluminum metal has changed remarkably little since first developed by Hall over seventy years ago. The electrolytic cell remains a shallow, carbon-lined container in a steel box structure. Steel connecting bars are imbedded in the bottom of the cell to carry current from the active carbon cathode through the steel box to the main negative conductor located outside the cell. These connector bars thus make only indirect contact with the pool of molten aluminum within the cell. The voltage efficiency of this cell is only about 40 percent, the voltage loss in the cathode is due mainly to the resistance between the conduction sequences (a) steel cathode connector bar, (b) iron-carbon interface, (c) spreading resistance in the carbon floor, and (d) interface carbon/molten aluminum. The greatest loss is probably due to the latter, caused by the formation of carbides and other compounds at the lining interface.

Thus a major improvement in voltage efficiency would be attained by inserting a cathode connector directly into the aluminum pool, providing a direct current path from the electric current source to the aluminum pool. A material suitable for use as cathode connecting bars for this application must be a good electrical conductor, must have good strength properties, must be insoluble in molten aluminum, must be stable at temperatures of about 875–975° C., and must be capable of being readily fabricated into the required form at an economic cost.

Bars of various refractory materials have been tested for this application, but none has proved satisfactory. Titanium and zirconium carbides and diborides and their mixtures can be hot pressed into suitable bars, but very close control of composition is required. Minor impurities when present have a profound effect on the sintering behavior of the pressed article. The short life of these materials at the conditions of heating encountered during aluminum processing limits their suitability in commercial operation.

It is an object of this invention to provide electrically conductive solid articles which are chemically inert and stable at temperatures up to about 975° C.

It is another object to provide electrically conductive solid articles which are stable in molten aluminum.

Further objects will become apparent from the following detailed description thereof.

I have discovered that electrically conductive solid articles consisting essentially of a mixture of a diboride and a nitride of titanium and/or zirconium are thermally stable and inert in molten aluminum. The articles are prepared by admixing stoichiometric amounts of finely divided particles of boron nitride and elemental titanium and/or zirconium and optionally elemental boron and/or molybdenum disilicide and hot pressing the mixture in a suitable die until reaction is complete.

The reaction between boron nitride and titanium can be illustrated by the equation (1)    $3Ti + 2BN \rightarrow TiB_2 + 2TiN$ and the resultant mixture will have a weight ratio of titanium diboride to titanium nitride of about 36:64.

By adding various amounts of elemental boron and a corresponding stoichiometric amount of titanium, variations in the proportion of titanium diboride to titanium nitride can be effected, such that the compositions can contain from about 32 to about 90 percent by weight of titanium diboride and from about 10 to about 68 percent by weight of titanium nitride. This can be illustrated by the equation (2)    $4Ti + 2BN + 2B \rightarrow 2TiB_2 + 2TiN$ The amounts of the reactants must be carefully regulated to insure complete reaction. Unreacted boron nitride, which is an electrical insulator, if present in substantial amounts, will detract from the electrical conductance of the articles of the invention. In general, the preferred reaction mixtures can contain from about 64–74 percent by weight of titanium, from about 10–26 percent by weight of boron nitride, and from 6–17 percent by weight of boron. Thus the preferred compositions will contain from about 34–70 percent by weight of titanium diboride and from about 30 to 66 percent by weight of titanium nitride.

Although the above discussion has been illustrated by references to titanium, the reaction is the same when zirconium metal is substituted for titanium, or, alternatively, when a mixture of titanium and zirconium metals is employed, with appropriate changes in the weight ratios of the diboride to the nitride of zirconium.

In addition to the above-described reactants, a minor amount of molybdenum disilicide can be added, from about 1–10 percent, preferably from about 1–4 percent. This component acts as a lubricant during forming and imparts added oxidation resistance to the formed article.

The reactants must be in finely divided form, that is, having a particle size of less than about 150 microns and preferably less than about 75 microns.

The articles of the invention are prepared by blending the finely divided reactants, compacting the blend under pressure, drying the compacts to remove moisture, and hot pressing in a suitable die under an inert gas atmosphere at a temperature of at least about 2000° C. up to about 2700° C. The pressure applied is generally from about 2000 p.s.i. and higher. Pressures up to about 15,000 p.s.i. can be employed. During hot pressing, an exothermic chemical reaction and substantial shrinkage of the composition in the die occur. In general, increasing the applied pressure will decrease the time required for complete reaction. At pressures below about 2000 p.s.i., the time required will be too protracted to be practical. Preferably a pressure at least about 3500 p.s.i. will be applied. When reaction is complete, evidenced by cessation of movement of the pressure-applying mechanism, the shaped article is cooled under pressure and removed from the die.

The hot-pressed articles of the invention are characterized by good electrical conductivity, relatively low density, chemical inertness, thermal stability, high mechanical strength and hardness, and, in particular, stability when immersed in molten aluminum.

Although the articles of the invention are outstanding for use as cathode connecting bars in the electrolytic cells used in the preparation of aluminum, they possess properties and characteristics that render them of considerable value for a number of other industrial applications. They are refractory materials, and their strength, chemical inertness, and stability at elevated temperatures suggest utility in and around furnaces and other high temperature equipment as bricks, blocks, setter tiles, and special shapes, and also make them suitable for applications in jet engine combustion chambers, rocket combustion chambers, lining for exhaust nozzles, laboratory crucibles, and the like. The compositions of the invention can be used as carriers for liquid metals, as well as in die casting of metals such as aluminum, magnesium, and copper alloys. Their high hardness characteristics make them eminently suitable for use in machine parts, chemical and metallurgical processing equipment, armor piercing bullets, high temperature bearings, seals, extrusion dies, and abrasion resistant articles of all types. The electrical conductivity of these compositions suggest use in the electrical and radio industry as electrical contacts. They are also suitable for laboratory ware, including combustion boats, crucibles, burner holders, and other shapes.

The articles can be utilized in solid form as prepared or as in ingot for subsequent machining, or they can be crushed into granular form. The granules can be used as a layer of high temperature protector material, as for example, protection around jet engines or rocket combustion chambers or around industrial furnace chambers. The granules can also be used as a coating or for boiling with other materials such as metals, vitreous or ceramic materials, and the like, to form articles suitable for many industrial uses as set forth above.

The invention will be further illustrated by the examples given below, but it is to be understood that the invention is not to be limited to the details disclosed therein. In the examples, percent is by weight.

EXAMPLE 1

A mixture containing 74.3% of titanium having a particle size less than 75 microns and 25.7% of boron nitride having a particle size less than 44 microns was prepared and pressed at 10 tons per square inch pressure into rods 5/16" in diameter and 5/16" long. An assembly of six of these compacted rods placed end to end was dried under vacuum at 110° C. for two hours and hot pressed in a graphite die under an argon atmosphere at 5 tons per square inch pressure. A temperature of 2400° C. was reached in 8.2 minutes, and the compacted rod assembly shrank in length. The temperature was maintained at 2400° C. until no further shrinkage was noted. The pressure was maintained five minutes longer and then the resultant article was removed from the die. The article measured 15/16" in length and had an apparent density of 4.46 g./cc.

The composition of the rod was found to be 36% titanium diboride and 64% titanium nitride by X-ray diffraction analysis.

The rod as prepared above was immersed in molten aluminum at 875° C. under a carbon monoxide atmosphere. No change in the rod was noted after 120 hours.

A one-half inch rod hot-pressed from titanium diboride in a manner similar to that given above was immersed in molten aluminum at 875° C. under an argon atmosphere. The rod cracked within forty-eight hours.

EXAMPLE 2

A mixture containing 70.0% of titanium having a particle size less than 75 microns, 18.1% of boron nitride having a particle size less than 44 microns, 7.9% of boron having a particle size less than 44 microns, and 4% of molybdenum disilicide having a particle size less than 75 microns was compacted under 7.5 tons per square inch pressure into rods 5/16" long and 5/16" in diameter. Assemblies of six compacts were dried and hot pressed following the procedure given in Example 1.

The resultant rods were 31/32" long and had an apparent density of 4.26 g./cc. The composition was determined to be 51% titanium diboride, 45% titanium nitride, and 4% molybdenum disilicide by X-ray diffraction analysis.

One rod was ground to a cylinder 0.30" in diameter and 5/8" long and testered for compression strength according to ASTM test E9–61. The compression strength was 191,000 p.s.i. Thus its strength-to-weight ratio is equal to or greater than many carbide compositions.

The hardness of a rod prepared as above was 91 Rockwell A, determined according to ASTM test B294–54T. It had a tensile strength of 25,666 p.s.i. determined according to ASTM test C496–64T.

EXAMPLE 3

A mixture containing 57.5% titanium having a particle size less than 150 microns, 18.3% zirconium having a particle size less than 100 microns, 4.3% boron having a particle size less than 44 microns, and 19.9% boron nitride having a particle size less than 44 microns was compacted under 7.5 tons per square inch pressure into rods 5/16" long and 5/16" in diameter. An assembly of six compacts was dried and hot pressed at 5 tons per square inch pressure in an argon atmosphere following the procedure given in Example 1. A temperature of 2500° C. was reached in 10.2 minutes and when shrinkage had ceased, the article was cooled under pressure for five minutes and removed from the die.

The resultant rod was one inch long and had an apparent density of 4.42 g./cc. X-ray diffraction analysis confirmed the mixture to be essentially titanium diboride, zirconium diboride, titanium nitride, and zirconium nitride.

The rod was immersed in molten aluminum at 875° C. under a carbon monoxide atmosphere. No change in the rod was noted after 120 hours.

EXAMPLE 4

A mixture containing 71.5% of titanium having a particle size less than 75 microns, 12.0% of boron nitride having a particle size less than 44 microns and 16.5% boron having a particle size of less than 44 microns was prepared and pressed at ten tons per square inch pressure into discs 1" in diameter. An assembly of these discs aggregating 10¾" in length was dried for two hours at 110° C. under vacuum and hot pressed in a graphite die under an argon atmosphere at 500 p.s.i. A temperature of 2000° C. was reached in 40 minutes. Peak temperature was noted at 2350° C. in two hours. At that time the pressure was increased to 3600 p.s.i. until no further shrinkage was noted. The total heating and cooling cycle was 3½ hours. The article measured 5" in length and had an apparent density of 4.64 g./cc. The Rockwell A hardness was 92. The composition was confirmed as 70% titanium diboride and 30% titanium nitride.

It will be apparent that many modifications and variations may be effected without departing from the novel concepts of the present invention, and the illustrative details disclosed herein are not to be construed as imposing undue limitations on the invention.

I claim:

1. An electrically conductive, hot-pressed article consisting essentially of a diboride and a nitride of at least one metal selected from the group consisting of titanium and zirconium and from 0 to 10 percent by weight of molybdenum disilicide prepared by a process which comprises admixing stoichiometric amounts of boron nitride and one or more elements selected from the group consisting of boron, titanium, and zirconium with from 0 to 10 percent of molybdenum disilicide, in finely divided form, and heating the mixture under pressure of from 2000 to 15,000 p.s.i. to a temperature of at least 2000° C. up to about 2700° C. under an inert atmosphere until reaction is complete.

2. An article according to claim 1 containing from 1 to 4 percent of molybdenum disilicide.

3. An article according to claim 1 consisting essentially of from about 32 to about 90 percent by weight of titanium diboride, from about 10 to about 68 percent by weight of titanium nitride, and from 0 to about 10 percent by weight of molybdenum disilicide.

4. An article according to claim 3 consisting essentially of from about 34 to about 70 percent by weight of titanium diboride, from about 30 to about 66 percent by weight of titanium nitride, and from 0 to about 10 percent by weight of molybdenum disilicide.

5. An article according to claim 4 containing from about 1 to about 4 percent by weight of molybdenum disilicide.

6. An article according to claim 1 wherein the pressure applied is at least 3500 p.s.i.

References Cited

UNITED STATES PATENTS

| | | | |
|---|---|---|---|
| 3,181,968 | 5/1965 | Mandorf, Jr. | 252—520 |
| 3,251,698 | 5/1966 | Colton | 252—520 |
| 3,256,103 | 6/1966 | Roche, Jr., et al. | 252—520 |
| 3,394,087 | 7/1968 | Huang et al. | 252—520 |
| 3,437,606 | 4/1969 | Mercuri | 252—520 |

DOUGLAS J. DRUMMOND, Primary Examiner

U.S. Cl. X.R.

252—518; 106—55, 57